United States Patent
Maluf et al.

(10) Patent No.: US 11,683,772 B2
(45) Date of Patent: Jun. 20, 2023

(54) CONTINUOUS SYNCHRONIZATION OF MULTIPLE RADIO DEVICES TO PHYSICAL TIME

(71) Applicant: Cisco Technology, Inc., San Jose, CA (US)

(72) Inventors: David A. Maluf, Mountain View, CA (US); Alexander X. Ke, Garden Hills, CA (US); Amr Elnakeeb, San Diego, CA (US)

(73) Assignee: Cisco Technology, Inc., San Jose, CA (US)

(*) Notice: Subject to any disclaimer, the term of this patent is extended or adjusted under 35 U.S.C. 154(b) by 146 days.

(21) Appl. No.: 17/249,792

(22) Filed: Mar. 12, 2021

(65) Prior Publication Data
US 2022/0295437 A1    Sep. 15, 2022

(51) Int. Cl.
*H04W 56/00*    (2009.01)

(52) U.S. Cl.
CPC ..... *H04W 56/0035* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 2013/0106657 A1* | 5/2013 | Perthold | G01S 5/021 |
| | | | 342/387 |
| 2013/0001950 A1 | 8/2013 | Bashar et al. | |
| 2015/0003589 A1 | 12/2015 | Koorapaty et al. | |
| 2017/0086153 A1* | 3/2017 | Yoon | H04W 56/001 |
| 2018/0003659 A1 | 12/2018 | Xu et al. | |
| 2019/0002076 A1 | 7/2019 | Shimezawa et al. | |
| 2020/0000598 A1 | 2/2020 | Noh et al. | |
| 2020/0333472 A1* | 10/2020 | Marshall | G01S 19/43 |

* cited by examiner

*Primary Examiner* — Saad Khawar
(74) *Attorney, Agent, or Firm* — Patterson + Sheridan, LLP (57) ABSTRACT

Embodiments include detection of physical events associated with a wireless network, where the detected physical events are associated with the measurable effects on radio signals between devices in the wireless network. The detected physical event and associated radio signal information is used to provide precise low cost time synchronization for a device in a network.

22 Claims, 6 Drawing Sheets

CONTINUOUS SYNCHRONIZATION OF MULTIPLE RADIO DEVICES TO PHYSICAL TIME

TECHNICAL FIELD

Embodiments presented in this disclosure generally relate to time synchronization among various wireless network devices. More specifically, embodiments disclosed herein relate to using physical events in real space and time to synchronize digital clocks at devices in a wireless network.

BACKGROUND

Reliable and precise time synchronization in communication networks is needed for some types of applications running in the networks. Different radio communication devices in the network often have different internal digital clocks which are only loosely synchronized with each other on the device-level. For some applications, such as wireless sensing type applications, a physical time reflecting a time of an actual physical event (e.g., a door closing, person moving, etc.) in an area covered by the network is needed by the applications in order to function properly. In some cases, since the various devices' internal clocks are independent, the physical event registers differently at different devices. For example, the event may be recorded at different times according to the internal clocks at various deices. The discrepancy between a physical time of an event and digital clocks may introduce errors into the device applications when synchronization of events is required. Providing reliable and precise clock synchronization among network devices without increasing network resource overhead and increased radio traffic remains a challenge.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example embodiment includes a method, the method includes compiling a first buffer of radio signal information, where the radio signal information may include at least signal magnitude and signal phase information from a first device in a network, and compiling a second buffer of radio signal information, where the radio signal information may include at least signal magnitude and signal phase information from a second device in the network. The method also includes converting the first buffer to a first frequency representation, converting the second buffer to a second frequency representation, determining a signal phase difference between the first frequency representation and the second frequency representation, determining a physical time offset using the determined signal phase difference, and synchronizing a device clock based on the physical time offset. Other embodiments of this aspect include corresponding computer systems, apparatus, and computer programs recorded on one or more computer storage devices, each configured to perform the actions of the methods.

Another example embodiment includes a system. The system includes one or more computer processors and a memory containing a program which when executed by the one or more computer processors performs an operation. The operation may include: compiling a first buffer of radio signal information, where the radio signal information may include at least signal magnitude and signal phase information from a first device in a network, compiling a second buffer of radio signal information, which may include at least signal magnitude and signal phase information from a second device in the network. The operation may also include converting the first buffer to a first frequency representation, converting the second buffer to a second frequency representation, determining a signal phase difference between the first frequency representation and the second frequency representation, determining a physical time offset using the determined signal phase difference, and synchronizing a device clock based on the physical time offset.

Another example embodiment includes a computer-readable storage medium. The computer-readable storage medium having computer-readable program code embodied therewith, the computer-readable program code executable by one or more computer processors to perform an operation. The operation may include: compiling a first buffer of radio signal information, where the radio signal information may include at least signal magnitude and signal phase information from a first device in a network, compiling a second buffer of radio signal information, which may include at least signal magnitude and signal phase information from a second device in the network. The operation may also include converting the first buffer to a first frequency representation, converting the second buffer to a second frequency representation, determining a signal phase difference between the first frequency representation and the second frequency representation, determining a physical time offset using the determined signal phase difference, and synchronizing a device clock based on the physical time offset.

Example Embodiments

Clock synchronization in wireless networks allows for reliable transmission and reception of wireless communication between the various network devices. In many examples, various internal clocks at network devices drift or fall out of synchronization while the devices function in the network. In some examples, protocols and methods have been developed in order to provide synchronization between the internal clocks at the various devices in a network.

For example, Network Time Protocol (NTP) is a commonly used internet protocol for clock synchronization. NTP can provide synchronization within approximately a millisecond level for devices in a network. While NTP provided synchronization is useful for some network applications executing in the network, the synchronization within the milliseconds is too coarse for high-precision applications such as radio frequency sensing. Additionally, precise clock synchronization may provide useful information for additional services such as device location determination, etc.

In some examples, Precision Time Protocol (PTP) is also synchronization protocol to synchronize clocks on a computer network. PTP relies on a primary-secondary relationship between clocks on the devices. For example, under IEEE 1588-2008, the primary device may broadcast the current time up to 10 times per second, which may be too infrequent for microsecond-level synchronization for clocks with excessive clock drift. Additionally, the PTP architecture assumes that the transmission time between primary and secondary devices is equal to the transmission time between the devices which is not sufficient in high precision applications.

Additionally, in the IEEE 802.11 standard, the Timing Synchronization Function (TSF) uses Beacon Frames to synchronize each node of a network with other nodes approximately every 0.1 seconds. However, relying solely on TSF creates problems with scalability since Beacon Frames collisions may occur in networks with large amounts of connected network devices. In order to address the gaps in function of the various methods using NTP, PTP, and TSF beacon frames, additional software and algorithms are often utilized in addition to these protocols in order to synchronize clocks on the device-level, yet these algorithms often suffer from the same problems of scalability, transmission time assumptions, and clock drift.

The systems and methods described herein detect physical events associated with a wireless network, where the detected physical event is associated with the measurable effects on radio signals between devices in the wireless network. The systems and methods herein further utilize the physical event to provide precise low cost time synchronization for a device in a network. In some examples, the physical event occurs in in a physical environment associated with a wireless network as described in relation to FIG. 1.

Figure 1:
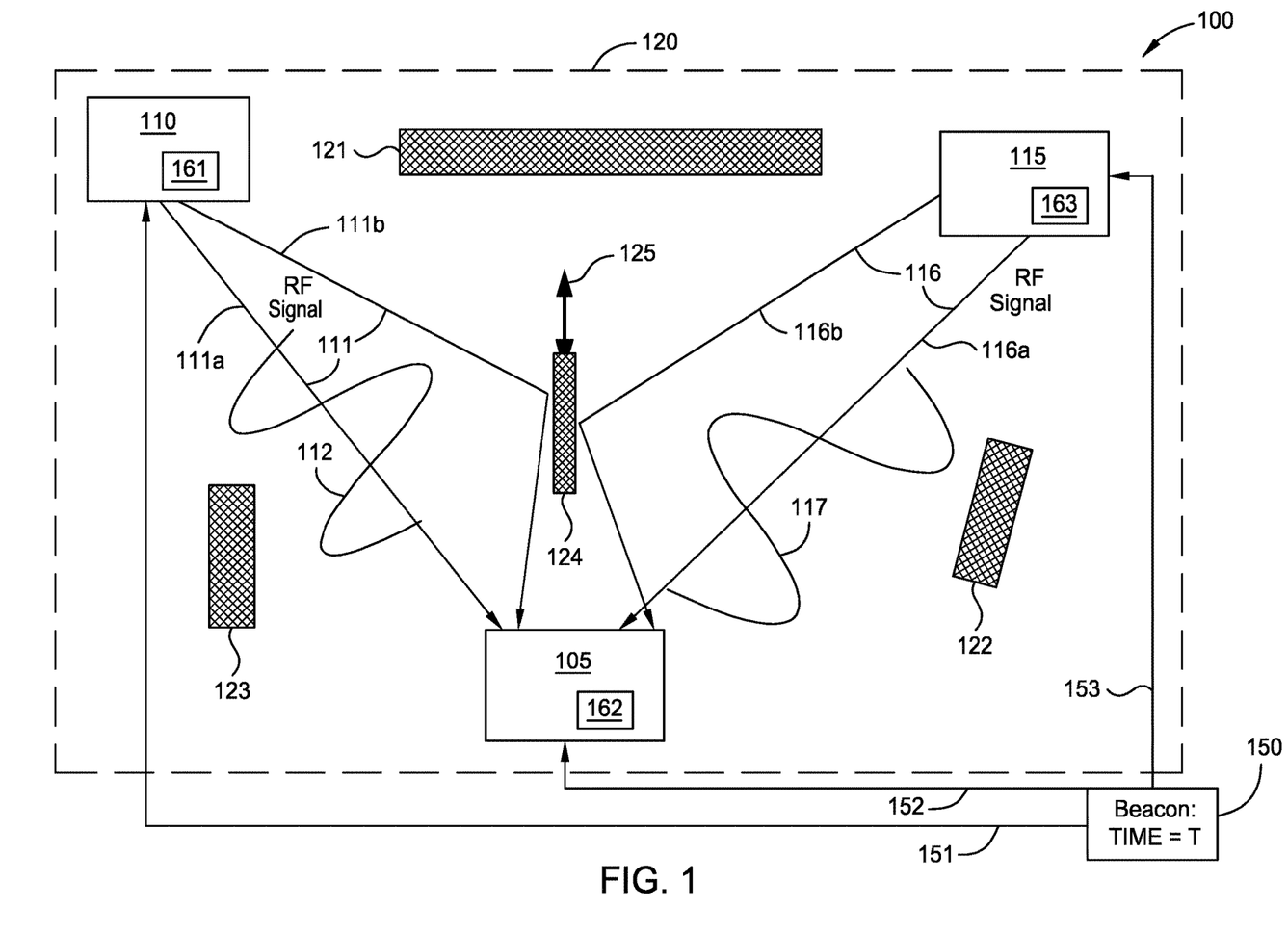
FIG. 1 illustrates a network, according to one embodiment.

FIG. 1 illustrates a network 100, according to one embodiment. The network 100 may include any type of wireless communication network, including Wi-Fi based wireless local area networks (WLAN) networks, long term evolution (LTE) or other cell based networks, Bluetooth based networks, and one or more other radio communication networks. The network 100 includes network devices 105, 110, and 115 which communicate with each other via radio frequency (RF) signals, such as RF signal 111 and RF signal 116.

The network devices 105, 110, and 115 may also be any type of communication device connected to the network 100 and capable of radio or wireless communication. For example, the network devices may include client devices, access points (APs), and other computer devices capable of wireless/radio communication transmissions in the network 100. The devices communicate using radio signals transmitted between the devices. For example, the network device 110 transmits the RF signal 111 to the network device 105 and the network device 115 transmits the RF signal 116 to the network device 105. While not shown, the network device 110 and 115 may also transmit RF signals between each other as well as receive additional RF signals from the network device 105 and other devices in the network 100.

In some examples, the RF signals 111 and 116 are associated with network traffic, such as packet based traffic or other communication protocols, where the network traffic is utilized by high precision applications executing on the network devices 105, 110, and 115. Without precise measurements, the high precision applications may begin to malfunction, fail, or generate erroneous/inaccurate data in the network 100.

In some examples, the network 100 and the network devices 105, 110, and 115, are within a physical area 120. The physical area 120 may include an environment and physical space associated with network 100 such as a room, a building, or outdoor space where the network devices 105-115 are able to communicate via RF signals. The physical area 120 may also contain physical objects 121-124. The physical objects 121-123 may include objects such as walls, doors, furniture, people, etc. In some examples, the physical objects 121-124 interact with the RF signals 111 and 116 to cause the RF signals 111 and 116 to travel through the physical area 120 in multiple paths. For example, the RF signal 111 includes paths 111a and 111b and the RF signal 116 includes paths 116a and 116b. The paths 111b and 116b interact with the physical object 124.

In some examples, the physical objects in the physical area 120 may move or otherwise cause a change in the RF signal propagation in the network 100. For example, the physical object 124 may move during a physical event 125 as illustrated by the arrow. The physical event 125 may include an event such as a door opening/closing, or other typical physical movement, which causes a change in the propagation of the RF signals, such as a change to the propagation of paths 111b and 116b. In some examples, the physical event takes place at a single global time independent of the network devices, where the time of the event can be detected and utilized for time synchronization as described herein.

In some examples, synchronization is needed by the packets coming out of multiple APs such as the network devices 105-115. These packets are then cooperatively/jointly used for some applications, such as high precision applications, at the devices. In some examples, different packets coming out of different APs are naturally not synchronized, as each device has its own clock, which may be synchronized to a single frame of reference. As described herein, these packets may be synchronized to an event, such as the physical event 125, that is independent of the devices themselves, if they are to be used cooperatively.

The network 100 includes a synchronization module 150 which provides the network devices 105, 110, 115, with time synchronization information, such as sync information 151, 152, and 153. The sync information 151, 152, and 153 may be utilized by digital clocks, such as clocks 161, 162, and 163 at the network devices to provide device level synchronization. For example, the sync information may include PTP or beacon frames to provide a rough or initial synchronization among the network devices in the network 100. However, as described herein, when the clocks 161, 161, and 164 are synchronized on the device-level using PTP or Beacon Frames, each network device may have a different lag between an event time (physical time) for an event in the network and the network devices' observation time of the event. Thus in some examples, device-level synchronization provided solely by the synchronization module 150, is insufficient for some highly sensitive time based applications such as RF sensing applications in the network.

In order to provide the precise synchronization information needed for high precision applications, the network devices 105-115 may continuously calculate a time offset between an arbitrary number of signals containing radio signal information such as Channel State Information (CSI). The network devices 105-115 may utilize various differential values of the magnitude of the CSI in the multipath environment. While described herein in relation to CSI, other methods may be used to extract the RF signal information which can be utilized as described herein.

In some examples, each of the network devices 105-115 observe the same physical space, such as the physical area 120, such that the physical event 125, is recorded or observed in the CSI of all devices. In some examples, when an event is not recorded in the CSI of all devices 105-115, a device that misses the signal would effectively be out of the signal strength of the motion. Thus as described herein, each of the devices 120-125 is able to observe and correlate the same event observed from multiple signals for devices that each has their own clock, such as the clocks 161-163.

For example, for each internal clock drifts and skews, the physical event 125 is bounded by time and space. Therefore, all other clocks, such as the clocks at the various devices, are relatively adjusted to the time of the physical event. This synchronization addresses any local device drifts and skews. In some examples, CSI describes how wireless signals propagate between the devices in the network at given subcarrier frequencies. This includes characterizing an electric field strength from a first device at a given instant in time, which may be identified by a numerical timestamp. In some examples, to detect the physical event 125 in the physical area 120, the network devices 105-115 compile CSI information for the RF signals in the network as a time series as shown in FIG. 2

Figure 2:
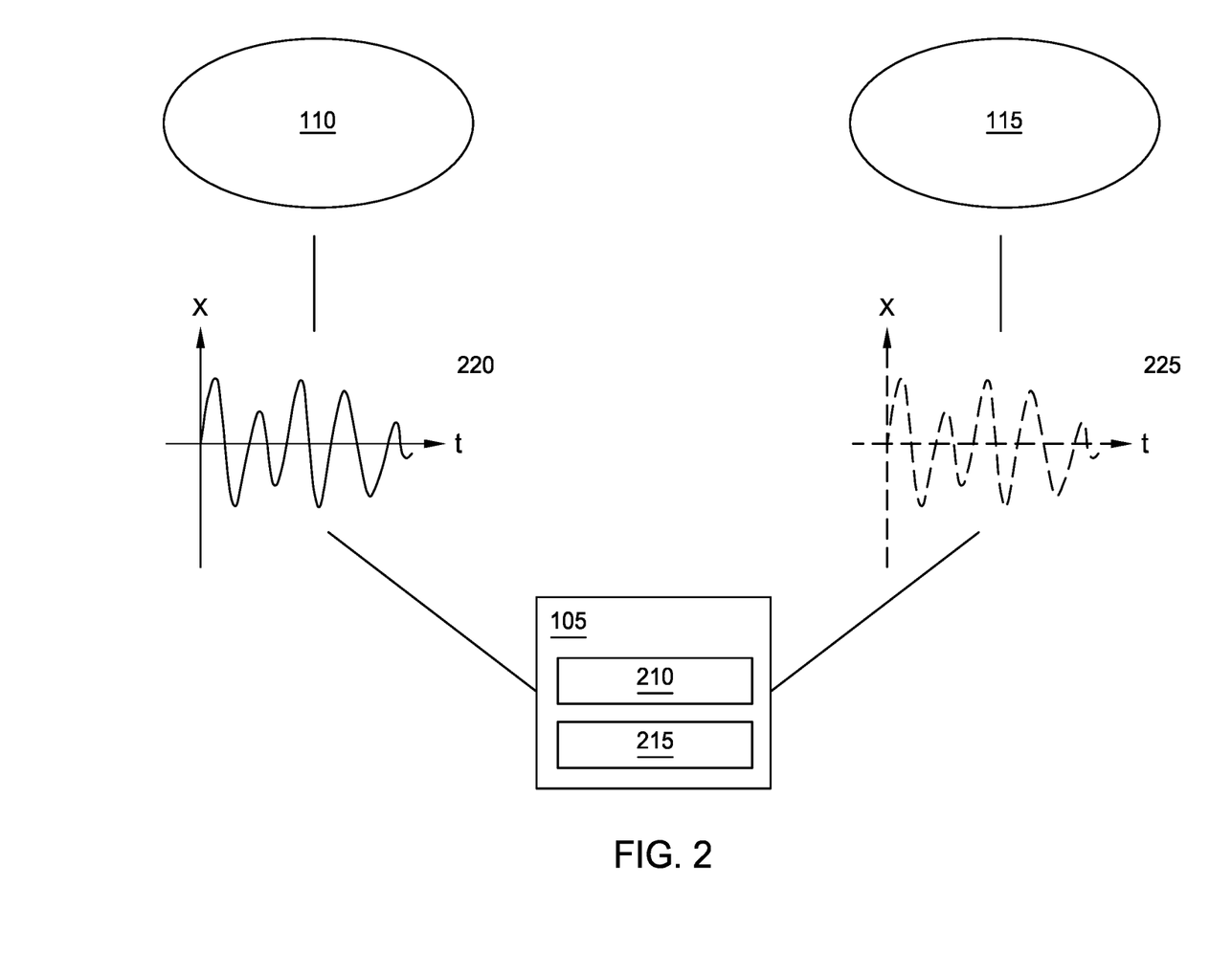
FIG. 2 illustrates radio signal information in a network, according to one embodiment.

FIG. 2 illustrates radio signal information in a network, according to one embodiment. While shown as being performed by the network device 105, the compilation of buffer data and other methods may be performed by any device in the network 100. In some examples, as the network device 105 receives radio signal information, such as CSI information, for each of the RF signals 111 and 116, the network device 105 compiles radio signal information buffers. For example, the network device 105 compiles a buffer 210 for radio signal information from the network device 110 and a buffer 215 for radio signal information from the network device 115.

In some examples, the buffers 210 and 215 include CSI information or other type of radio signal information containing at least radio signal phase and magnitude information. In some examples, the buffers 210 and 215 may also include a plurality of additional or alternative radio signal information from a variety of radio types (Wi-Fi, cellular, etc.) To accurately detect a physical event, such as the physical event 125 in the network 100, the network device 105 converts the buffers 210 and 215 to a radio frequency representation, such as a frequency domain signal. To provide sufficient data for the conversion of the buffers, the network device 105 may set a primary buffer and one or more secondary buffers. In one embodiment, radio signal information which is most reliably received and compiled at the network device 105 (e.g., received from another device the most) is set as a primary buffer.

In some examples, when the primary buffer and any given secondary buffer reach a minimum density of observations per time, an offset using frequency representations is calculated to provide synchronization. In some examples, the amount of CSI measurements needed to efficiently provide synchronization calculations may include a moving window of time (e.g., 1-2 seconds) which can track the collected data in the buffers 110 and 115. In some examples, the moving window is larger than any time-offsets across the devices 110-115 (e.g., a time offset between APs in the network 100).

As described above, when sufficient information is compiled in the buffer the calculation of the synchronization information commences. In some examples, the RF information included in the buffers may include an RF signal magnitude averaged over the subcarriers, or a measured variability among the subcarriers in an RF computed as the variance among the subcarriers. Other methods and information may also be utilized represents/model the signals for FFT.

In some examples, the buffer 210, as a primary buffer, is converted to frequency representation 220 and the buffer 215, as a secondary buffer is converted to frequency representation 225. In some examples, the network device 105 converts the buffers 210 and 215 using a Fast Fourier Transform (FFT) resulting in a primary transform $P_{fft}$ and a secondary transform $S_{fft}$. In some examples, the transforms are represented by the representations 220 and 225. These representations are used by the network device 105 to calculate the phase difference between the secondary FFT and the primary FFT, as described in further detail in relation to FIG. 3

Figure 3:
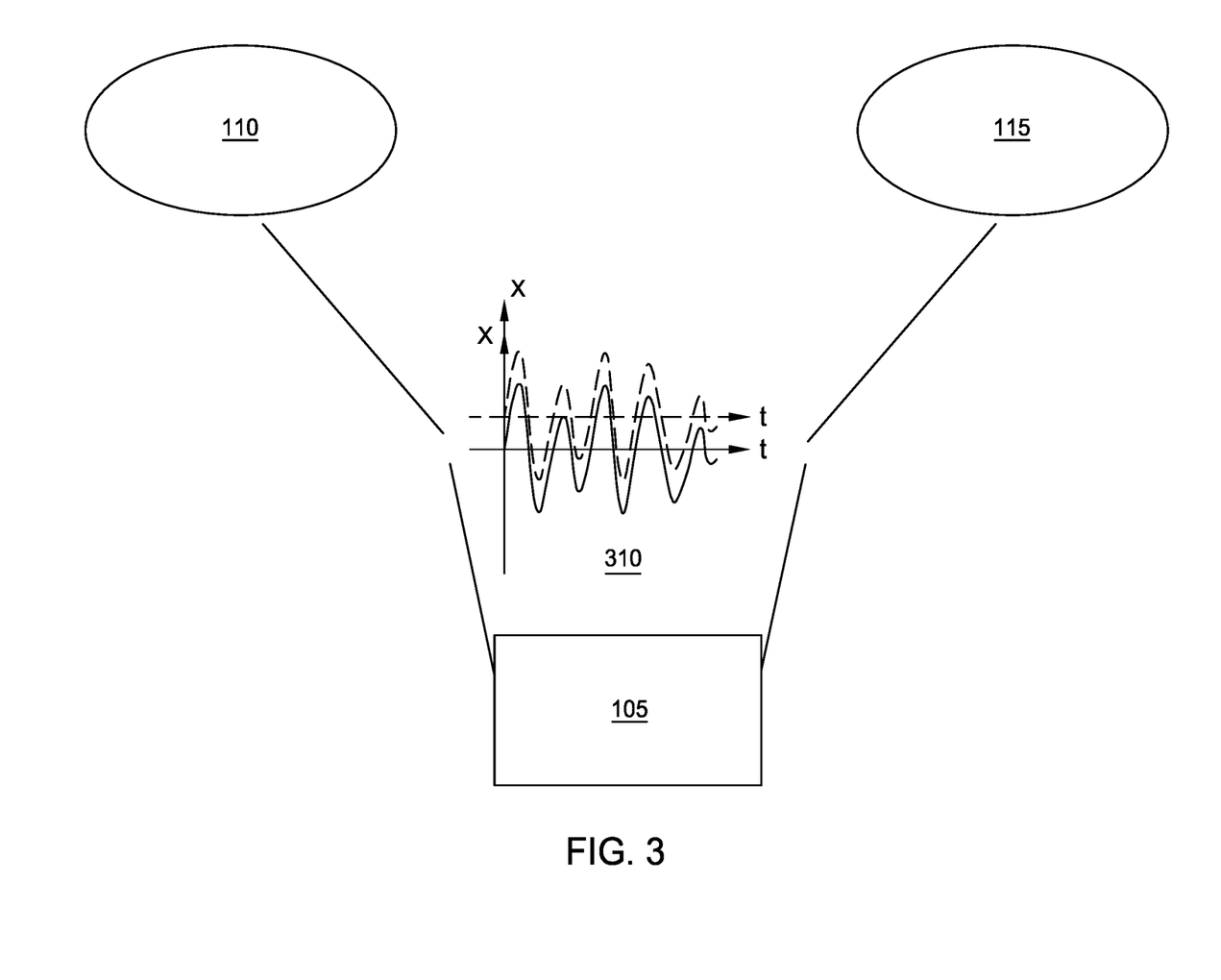
FIG. 3 illustrates a phase difference in radio signal transmissions in a network, according to one embodiment.

FIG. 3 illustrates a phase difference in radio signal transmissions in a network, according to one embodiment. In some examples, phase offset due to physical distance offset of the motion from primary and secondary is not resolved but is assumed as an inherit system noise with a very small in value (<1-10 ns) compared to the corrections. In some examples, the correction has a less than 1% error value relative to sync corrections. As described above, the representations 220 and 225 may be utilized to calculate a phase difference representation 310. In some examples, the phase difference between the secondary and primary FTT is represented by Equation 1.

$$\varphi = \text{PHASE}(Sfft) - \text{PHASE}(Pfft) \quad \text{Equation 1:}$$

In some examples, the network device 105 determines values of the 95$^{th}$ percentile or greater of the absolute value of the phase difference $|\varphi|$, as well as corresponding frequencies $f_{95}$ and phase differences $\varphi_{95}$. These values are used to calculate the offset between the two signals as shown in Equation 2, where the average of every phase difference is divided by its corresponding frequency.

$$\Delta = \text{AVERAGE}(\varphi_{95}/f_{95}) \quad \text{Equation 2:}$$

The offset $\Delta$ derived from Equation 2 describes the offset of the secondary signal $s_i$ from the primary signal m at the given buffer states for which the offset $\Delta$ was calculated. In some examples, offset $\Delta$ may be positive or negative, where a positive offset $\Delta$ would mean that the secondary signal is ahead of the primary signal by the offset $\Delta$ units of time. This offset $\Delta$ is utilized to determine the physical time of the event as well as the offset for each of the devices associated with the RF signals 111 and 116. This offset is used to provide precise synchronization as described in relation to FIGS. 4-6.

Figure 4:
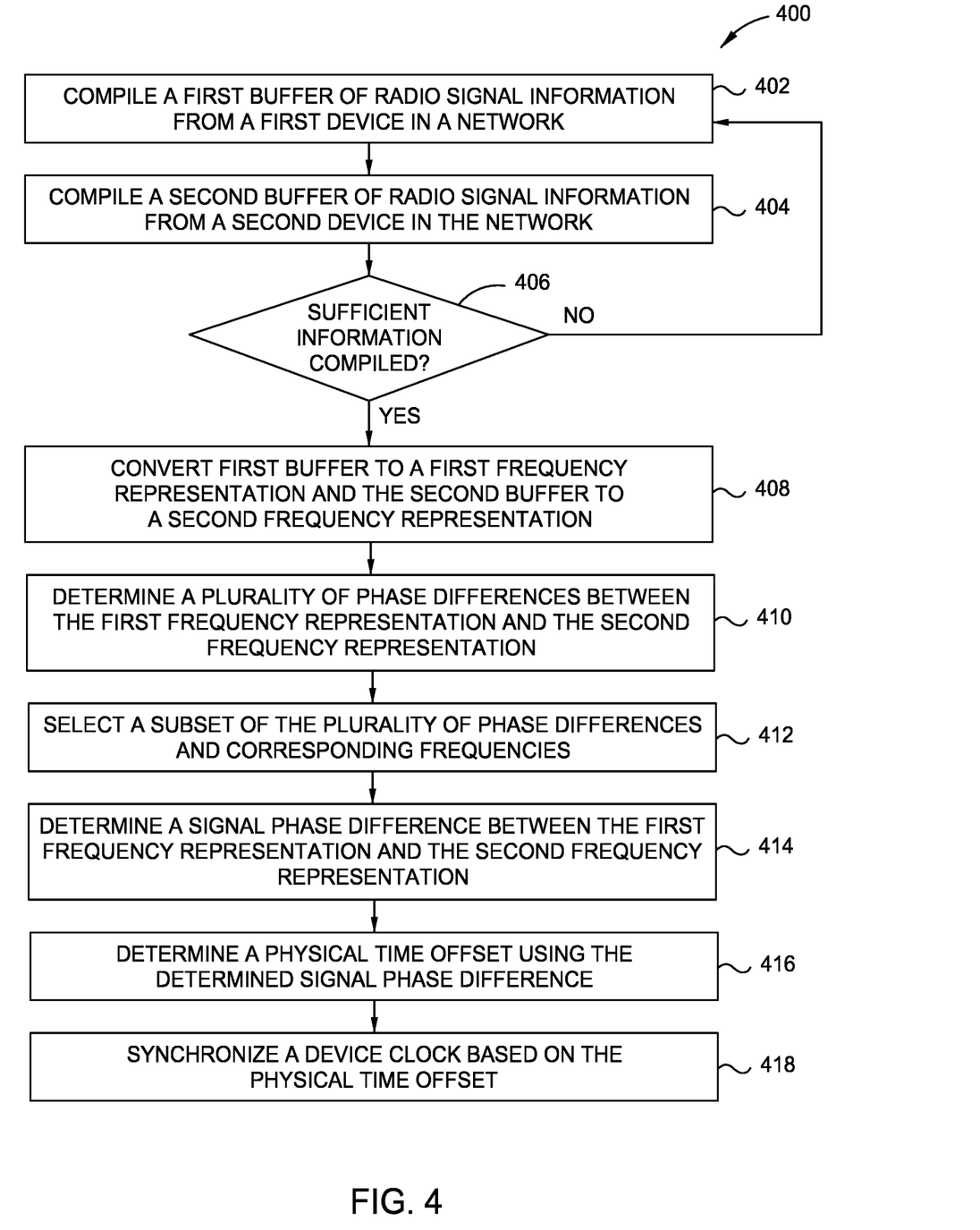
FIG. 4 is a method for clock synchronization, according to one embodiment.

FIG. 4 is a method for clock synchronization, according to one embodiment. Method 400 begins at block 402 where the network device 105 compiles a first buffer of radio signal information comprising at least signal magnitude and signal phase information (e.g., CSI information) of RF signals received from a first device in a network. For example, the network device 105 compiles the buffer 210 with a time series of CSI information from the RF signal 111, including information representing paths 111a and 111b.

At block 404, the network device 105 compiles a second buffer of radio signal information comprising at least signal magnitude and signal phase information of RF signals received from a second device in the network. For example, the network device 105 compiles the buffer 215 with a time series of CSI information from the RF signal 116, including information representing paths 116a and 116b. In some examples, the network device 105 also compiles a plurality of other buffers of radio signal information for other devices in the network 100 which may also be synchronized using physical events as described herein.

At block 406, the network device 105 determines whether sufficient data has been compiled to determine a signal phase difference between the signals from the network devices 110 and 115 and to determine a physical time offset. In some examples, the first buffer may be set as the primary buffer and the second buffer as secondary buffer based on the frequency of radio signal information received at the network device 105 for the respective RF signals. In some examples, a minimum density of observations per time is achieved for the primary and at least one secondary buffer in order to provide an accurate calculation for the synchronization information. For example, the buffers may measure CSI information for a given minimum window of time (e.g., 1-2 seconds) in order to proceed with synchronization. In some examples, the moving window is larger than any time offsets across the devices 110-115 which may be calculated as described in relation to FIG. 6.

In an example where more data/information is desired, method 400 proceeds to block 402 to resume compilation of radio signal information. Otherwise, the method 400 proceeds to block 408 where the network device 105 converts the first buffer to a first frequency representation and the second buffer to a second frequency representation. For example, as described in relation to FIG. 2, the network device 105 may apply a FFT to the buffers 210 and 215 to generate the $P_{fft}$ and $S_{fft}$ for the buffers.

At block 410, the network device 105 determines a plurality of phase differences between the first frequency representation and the second frequency representation. For example, as described in relation to FIG. 3, the network device 105 calculates a phase difference representation 310, or the phase differences between the $P_{fft}$ and $S_{fft}$ using Equation 1.

At block 412, the network device 105 selects a subset of the plurality of phase differences and corresponding frequencies. For example, the $95^{th}$ percentile may be used as a lower bound of phase differences utilized by the network device 105. In some examples, a $95^{th}$ percentile is a heuristic number and experimental number. Since RF signals are inherently noisy, it is difficult to match 100% independent signals. The $95^{th}$ percentile is a confidence choice (and may be set lower down, e.g. to $75^{th}$) for noisy electronics. In some examples, as the process is continues, reliability builds over time. In some examples, the correction over time is a combination of the data over time using a Kalman filter where noise is modeled along the away over time.

In some examples, choosing phase differences that are too small would result in much more variability in the offset $\Delta$, which is calculated in the next block. For example, if the signals in each of the buffers are highly correlated with each other, the phase difference corresponding to each frequency would be the same. Thus, choosing phase differences and averaging them would be unnecessary. However, in practice, there are variabilities such as errors in measurement of CSI, etc., such that selecting larger phase differences yields a more reliable offset $\Delta$.

At block 414, the network device 105 determines an average signal phase difference between the first frequency representation and the second frequency representation. For example, the network device 105 utilizes Equation 2 and the selected phase differences in order to determine the offset $\Delta$.

At block 416, the network device 105 determines a physical time offset using the determined signal phase difference. For example, using the offset $\Delta$ the network device 105 relates the physical time of the physical event 125 to the times of the received signals from the network device 110 and 115. In some examples, the unit of time is the microsecond timestamp associated with each CSI packet where the use of the offset $\Delta$ provides for microsecond resolution. The timestamp may also be generated by the clock in the network device. In some examples, the use of physical time offset $\Delta$, allows for using a timestamp from any clock which has a constant frequency, or "ticks" at a consistent rate.

At block 418, the network device 105 synchronizes its clock based on the physical time offset. For example, the network device 105 uses the determined physical time offset to relate the internal time at the clock 162 as well as relate to the reported times of the network devices 110 and 115. In some examples, the network device 105 uses a base level of synchronization and adjusts the internal clocks based on the determined physical offset. For example, the internal clock of the network devices 1105, 110, and 115 may each be synchronized or corrected using the physical offset value.

In some examples, the device 105 and the devices 110 are 115 perform the method 400 at a low computational cost. Thus, the method 400 may be performed continuously or often as needed at each of the devices. In some examples, device 105 executing method 400 makes no assumptions about transmission times in the network or observation lag of events, and thus provides a centralized and scalable solution to continuously synchronize event-level data and avoids problems associated with device-level synchronization. An offset may be computed every time data is received from any network device, and it can support an arbitrary number of devices by storing the offset for each given device in a data structure such as a hash table for quick lookup. In some examples, the offset may be stored such that an update to the synchronization may be performed less frequently (e.g., every hour) as described in relation to FIG. 5.

Figure 5:
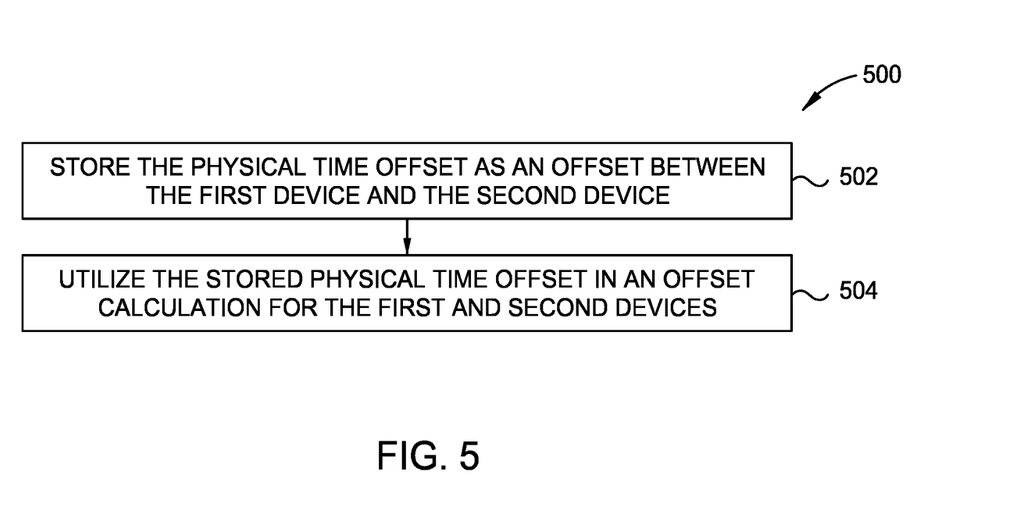
FIG. 5 is a method for clock synchronization using a stored offset, according to one embodiment.

FIG. 5 is a method for clock synchronization using a stored offset, according to one embodiment. Method 500 begins at block 502 where the network device 105 stores the physical time offset as an offset between the first device and the second device. For example, the offset $\Delta$ may calculated for a given time and stored for further use in an event where continuous calculation is not feasible.

At block 504, the device 105 utilizes the stored physical time offset in an offset calculation for the first and second devices. For example, as subsequent RF signals are received at the device 105, the stored offset may be utilized by the device 105 to provide synchronization between the device 105 and the received network traffic in the RF signals. In some examples, the stored offset is added or subtracted from the device clock depending if it is ahead or lagging relatively to the other in any digital signal processor (DSP) computation. For example when an DSP will analyze the signals from two devices, such processing is more accurate.

Figure 6:
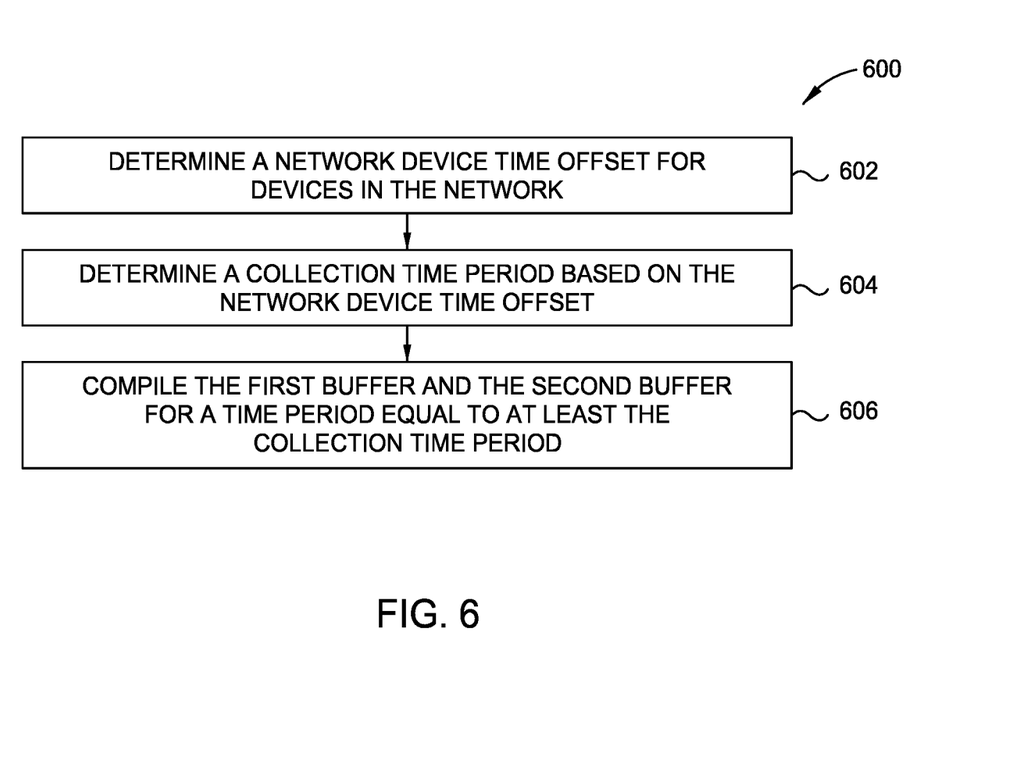
FIG. 6 is a method for compiling radio signal information, according to one embodiment.

FIG. 6 is a method for compiling radio signal information, according to one embodiment. In some examples, such as discussed in relation to block 406 of FIG. 4, the amount of radio signal information used by a device to accurately perform synchronization calculations may vary as described in method 600. Method 600 begins at block 602 where the network device 105 determines a network device time offset for devices in the network. In some examples, the network device time offset may be provided by the module 150, where the network device time offset is an estimated offset between each of the devices 105-115 as determined by the module 150.

At block 604, the network device 105 determines a collection time period based on the network device time offset. For example, the network device determines a collection time period that is at least equal or greater than the time offset between the network devices to provide sufficient data for synchronization calculations.

At block 606, the network device 105 compiles the first buffer and the second buffer for a time period equal to at least the collection time period, where the time period provides sufficient data for determining the physical time offset. For example, as described in block 406, the network device 105 will collect data according to the collection time period for bother of the buffers before performing the synchronization functions described herein.

Figure 7:
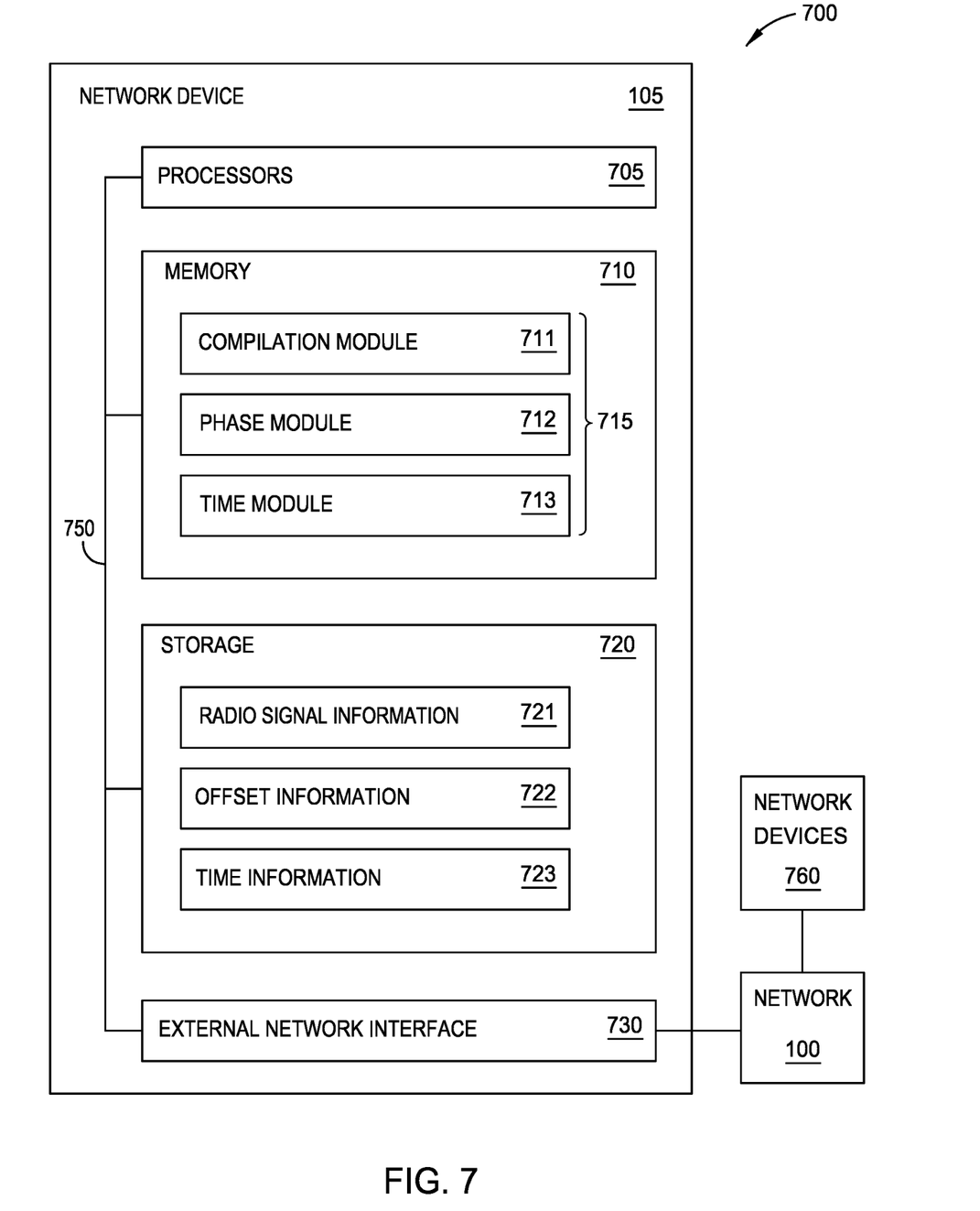
FIG. 7 is a block diagram of a network device, according to one embodiment.

FIG. 7 is a block diagram of a network device 701, such as any of the network devices 105-115. In some examples, the network device 701 is in the arrangement 700 including the network 100 and the network devices 760. The network device 701 is shown in the form of a general-purpose computing device, but may include a server and/or application executing on a cloud network. The network device 701 may include, but is not limited to, one or more processing units or processors 705, a memory 710, a storage system 720, a network interface 730 connecting the network device 701 to the network 100, and a bus 750 that couples various system components including the memory 710 and storage system 720 to processors 705.

Bus 750 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The network device 701 typically includes a variety of computer system readable media. Such media may be any available media that is accessible by the network device 701, and it includes both volatile and non-volatile media, removable and non-removable media.

Memory 710 can include computer system readable media in the form of volatile memory, such as random access memory (RAM) and/or cache memory. The network device 701 may further include other removable/non-removable, volatile/non-volatile computer system storage media. By way of example, storage system 720 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 750 by one or more data media interfaces. As will be further depicted and described below, memory 710 may include at least one program product having a set (e.g., at least one) of program modules that are configured to carry out the functions of various embodiments described herein.

The network device 701 may further include other removable/non-removable, volatile/non-volatile computer system storage media. In some examples, the storage system 720 may be included as part of memory 710 and may typically provide a non-volatile memory for the networked computing devices, and may include one or more different storage elements such as Flash memory, a hard disk drive, a solid state drive, an optical storage device, and/or a magnetic storage device. For example, storage system 720 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 750 by one or more data media interfaces. Storage system 720 may include media for RF information 721, offset information 722, time information 723, and other information stored for access and use by the network device 701.

Memory 710 may include a plurality of modules 715 for performing various functions described herein in relation to FIGS. 1-6. The modules 715 generally include program code that is executable by one or more of the processors 705. As shown, modules 715 include the compilation module 711, phase module 712, and time module 713. The modules 715 may also interact with each other and storage system 720 to perform certain functions as described herein in relation to FIGS. 4-6.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   compiling, at a first network device, first radio signal information comprising signal magnitude and signal phase information derived from RF signals received from a second device in a network;
   compiling, at the first network device, second radio signal information comprising signal magnitude and signal phase information derived from RF signals received from a third device in the network;
   converting the first radio signal information to a first frequency representation;
   converting the second radio signal information to a second frequency representation;
   determining a signal phase difference between the first and second frequency representations, wherein the signal phase difference is based at least in part on a physical event that interacted with RF signals transmitted in the network;
   determining a physical time offset using the determined signal phase difference; and
   synchronizing a device clock in the first network device based on the physical time offset.

2. The method of claim 1, wherein the first radio signal information and the second radio signal information comprise channel state information (CSI).

3. The method of claim 1, wherein the physical event was within a signal coverage area of the network, and wherein the physical event interacted with the RF signals transmitted by at least the second device and the third device.

4. The method of claim 1, wherein determining the signal phase difference between the first frequency representation and the second frequency representation comprises:
   determining a plurality of phase differences between the first frequency representation and the second frequency representation; and
   selecting a subset of the plurality of phase differences and corresponding frequency values.

5. The method of claim 4, wherein determining the physical time offset comprises:
    determining an average of the selected subset of the plurality of phase differences divided by the corresponding frequency values.

6. The method of claim 1, further comprising:
    storing the physical time offset as an offset between the second device and the third device; and
    utilizing the stored physical time offset in an offset calculation for the second and third devices.

7. The method of claim 1, further comprising:
    determining a network device time offset for devices in the network;
    determining a collection time period based on the network device time offset; and
    compiling the first radio signal information and second radio signal information for a time period equal to at least the collection time period, wherein the time period provides sufficient data for determining the physical time offset.

8. A network device comprising:
    one or more computer processors; and
    a memory containing a program which when executed by the one or more computer processors performs an operation comprising:
        compiling, at the network device, first radio signal information comprising signal magnitude and signal phase information derived from RF signals received from a second device in a network;
        compiling, at the network device, second radio signal information comprising signal magnitude and signal phase information derived from RF signals received from a third device in the network;
        converting the first radio signal information to a first frequency representation;
        converting the second radio signal information to a second frequency representation;
        determining a signal phase difference between the first and second frequency representations, wherein the signal phase difference is based at least in part on a physical event that interacted with RF signals transmitted in the network;
        determining a physical time offset using the determined signal phase difference; and
        synchronizing a device clock in the network device based on the physical time offset.

9. The network device of claim 8, wherein the first radio signal information and the second radio signal information comprise channel state information (CSI).

10. The network device of claim 8, wherein the physical event was within a signal coverage area of the network, wherein the physical event interacted with RF signals transmitted by at least the second device and the third device.

11. The network device of claim 8, wherein determining the signal phase difference between the first frequency representation and the second frequency representation comprises:
    determining a plurality of phase differences between the first frequency representation and the second frequency representation; and
    selecting a subset of the plurality of phase differences and corresponding frequency values.

12. The network device of claim 11, wherein determining the physical time offset comprises:
    determining an average of the selected subset of the plurality of phase differences divided by the corresponding frequency values.

13. The network device of claim 8, wherein the operation further comprises:
    storing the physical time offset as an offset between the second device and the third device; and
    utilizing the stored physical time offset in an offset calculation for the first and second devices.

14. The network device of claim 8, wherein the operation further comprises:
    determining a network device time offset for devices in the network;
    determining a collection time period based on the network device time offset; and
    compiling the first radio signal information and second radio signal information for a time period equal to at least the collection time period, wherein the time period provides sufficient data for determining the physical time offset.

15. A computer program product comprising:
    a non-transitory computer-readable storage medium having computer-readable program code embodied therewith, the computer-readable program code executable by one or more computer processors to perform an operation, the operation comprising:
        compiling, at a first network device, first radio signal information comprising signal magnitude and signal phase information derived from RF signals received from a second device in a network;
        compiling, at the first network device, second radio signal information comprising signal magnitude and signal phase information derived from RF signals received from a third device in the network;
        converting the first radio signal information to a first frequency representation;
        converting the second radio signal information to a second frequency representation;
        determining a signal phase difference between the first and second frequency representations, wherein the signal phase difference is based at least in part on a physical event that interacted with RF signals transmitted in the network;
        determining a physical time offset using the determined signal phase difference; and
        synchronizing a device clock in the first network device based on the physical time offset.

16. The computer program product of claim 15, wherein the first radio signal information and the second radio signal information comprise channel state information (CSI).

17. The computer program product of claim 15, wherein the physical event was within a signal coverage area of the network, wherein the physical event interacted with RF signals transmitted by at least the second device and the third device.

18. The computer program product of claim 15, wherein determining the signal phase difference between the first frequency representation and the second frequency representation comprises:
    determining a plurality of phase differences between the first frequency representation and the second frequency representation; and
    selecting a subset of the plurality of phase differences and corresponding frequency values; and
    wherein determining the physical time offset comprises:
        determining an average of the selected subset of the plurality of phase differences divided by the corresponding frequency values.

19. The computer program product of claim 15, wherein the operation further comprises:
   storing the physical time offset as an offset between the second device and the third device; and
   utilizing the stored physical time offset in an offset calculation for the second and third devices.

20. The computer program product of claim 15, wherein the operation further comprises:
   determining a network device time offset for devices in the network;
   determining a collection time period based on the network device time offset; and
   compiling the first radio signal information and second radio signal information for a time period equal to at least the collection time period, wherein the time period provides sufficient data for determining the physical time offset.

21. A method comprising:
   compiling, at a first network device, first radio signal information comprising signal magnitude and signal phase information derived from RF signals received from a second device in a network;
   compiling, at the first network device, second radio signal information comprising signal magnitude and signal phase information derived from RF signals received from a third device in the network;
   converting the first radio signal information to a first frequency representation;
   converting the second radio signal information to a second frequency representation;
   determining a signal phase difference between the first and second frequency representations, further comprising:
      determining a plurality of phase differences between the first frequency representation and the second frequency representation; and
      selecting a subset of the plurality of phase differences and corresponding frequency values;
   determining a physical time offset using the determined signal phase difference; and
   synchronizing a device clock in the first network device based on the physical time offset.

22. The method of claim 21, wherein determining the physical time offset comprises:
   determining an average of the selected subset of the plurality of phase differences divided by the corresponding frequency values.

* * * * *